United States Patent
Rauch

(10) Patent No.: US 12,368,605 B2
(45) Date of Patent: Jul. 22, 2025

(54) REQUESTING A CERTIFICATE IN A DOCUMENTED MANNER USING A REGISTRATION POINT

(71) Applicant: Siemens Aktiengesellschaft, Munich (DE)

(72) Inventor: Martin Rauch, Mering (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 18/842,723

(22) PCT Filed: Mar. 2, 2023

(86) PCT No.: PCT/EP2023/055339
§ 371 (c)(1),
(2) Date: Aug. 29, 2024

(87) PCT Pub. No.: WO2023/169926
PCT Pub. Date: Sep. 14, 2023

(65) Prior Publication Data
US 2025/0112790 A1  Apr. 3, 2025

(30) Foreign Application Priority Data
Mar. 8, 2022 (EP) ..................... 22160717

(51) Int. Cl.
*H04L 9/32* (2006.01)
(52) U.S. Cl.
CPC .......... *H04L 9/3268* (2013.01); *H04L 9/3265* (2013.01)
(58) Field of Classification Search
CPC ............................ H04L 9/3268; H04L 9/3265
(Continued)

(56) References Cited

U.S. PATENT DOCUMENTS 12,174,979 B2 * 12/2024 Hanna .................... H04L 9/3247
2006/0109966 A1 * 5/2006 Sasakura ............. H04L 12/2823
379/177

(Continued)

FOREIGN PATENT DOCUMENTS

EP   2770467 A1   8/2014
EP   3726798 A1   10/2020
(Continued)

OTHER PUBLICATIONS

International Search Report & Written Opinion for PCT /EP2023/055339 mailed on Apr. 6, 2023.

*Primary Examiner* — Thanh T Le
(74) *Attorney, Agent, or Firm* — Schmeiser, Olsen & Watts LLP

(57) ABSTRACT

A system is provided for requesting certificates for a user in a documented manner, comprising at least one registration point, a logging device, and a certification point which are configured to carry out the following steps: receiving in the registration point a certificate request for issuing a certificate to a user, transmitting a logging message which contains information on the certificate request from the registration point to a logging device, receiving a confirmation identifier if the information in the logging device has been successfully stored, forwarding to the certification point an expanded certificate request message which is complemented by the confirmation identifier, checking the confirmation identifier, and processing the expanded certificate request and outputting a certificate response by the certification point only if the check is successfully carried out.

11 Claims, 3 Drawing Sheets

(58) Field of Classification Search
USPC .......................................................... 713/157
See application file for complete search history.

(56) References Cited

U.S. PATENT DOCUMENTS

| | | | | |
|---|---|---|---|---|
| 2014/0245409 | A1* | 8/2014 | Falk | H04L 63/0823 |
| | | | | 726/6 |
| 2016/0087804 | A1* | 3/2016 | Park | H04L 9/3268 |
| | | | | 713/156 |
| 2019/0081774 | A1* | 3/2019 | Uldridge | G06F 21/64 |
| 2019/0253263 | A1* | 8/2019 | Qiu | H04L 63/102 |
| 2021/0326872 | A1* | 10/2021 | Robotham | G06Q 20/401 |
| 2022/0343005 | A1* | 10/2022 | Hanna | H04L 9/0643 |

FOREIGN PATENT DOCUMENTS

| | | |
|---|---|---|
| WO | 2018167253 A1 | 9/2018 |
| WO | 2019034509 A1 | 2/2019 |

\* cited by examiner

REQUESTING A CERTIFICATE IN A DOCUMENTED MANNER USING A REGISTRATION POINT

CROSS-REFERENCE TO RELATED APPLICATIONS

This application is a national stage of PCT Application No. PCT/EP2023/055339, having a filing date of Mar. 2, 2023, claiming priority to EP Application Serial No. 22160717.9, having a filing date of Mar. 8, 2022, the entire both contents of which are hereby incorporated by reference.

FIELD OF TECHNOLOGY

The following relates to methods for requesting certificates in a documented manner using at least one registration point at a certification point in a public-key infrastructure.

BACKGROUND

A public-key infrastructure (PKI) in cryptology designates a system which can issue, distribute, and check digital certificates. A digital certificate, referred to in short as a certificate hereinafter, is a digitally signed electronic data structure which is used to prove the authenticity of objects. The PKI typically comprises a certification point, which provides the certificate and transmits the signature of certificate requests, and a registration point, at which devices can request certificates. The registration point checks the correctness of the data in the certificate request and possibly approves them. The items of information from the approved request can then be signed by the certification point, wherein the desired certificate results. The individual components are typically connected to one another by a data communication network and exchange requests for certificates, responses thereto, and the like by communication messages among one another.

EP 2 770 467 A1 describes a method for expanding the attributes in a credential request, which is sent from a client to a credential issuer for issuing a credential. In the credential request, additional attributes of the requesting client are determined and confirmed in an intermediary unit arranged between client and credential issuer. The credential is issued by the credential issuer depending on the credential requirement and the confirmed attribute. When issuing certificates in the public-key infrastructure, it is important that requests which are sent to the certification point are transmitted from a trustworthy component, for example a device or a registration point. In the case of a registration point, it typically has to authenticate itself to the certification point in order to submit a request. Cryptographic methods are usually used for this purpose and the registration point has the required credentials for this purpose, for example a cryptographic key.

If an attacker can gain possession of the credentials of the registration point, it can request certificates from a certification point in the name of this registration point and install them, for example, on forged devices and bring these into circulation as supposedly authentic devices.

If an attack on a registration point is detected, it is important to determine which certificates were requested from the attacked registration point, i.e., requested and thus potentially captured by the attacker. This can be difficult, for example, if a certificate request, more precisely a request message was transmitted via multiple hops to the certification point and the sender information is evaluated and changed by multiple components, and therefore items of information on the origin registration point are lost on the way.

Events such as a reception and output of messages, are often logged. The log information is either stored locally, for example as an event log, or sent to a central log server and stored there. In the case of local storage of log data on the registration point, an attacker can also obtain access to this log information and manipulate it. Moreover, there is the risk that the logging will be prevented entirely by the attacker, for example by manipulation of the registration point software or the use of their own software.

SUMMARY

An aspect of embodiments of the present invention provides a method with which a certificate request can be traced in a manipulation-safe manner back to the requesting registration point.

According to a first aspect, an embodiment the invention relates to a method for requesting a certificate in a documented manner using at least one registration point at a certification point in a public-key infrastructure, comprising the following steps:
 a) receiving a certificate request to issue a certificate for a user in the registration point,
 b) sending a logging message, which contains information on the certificate request, from the registration point to a logging device,
 c) receiving a confirmation identifier when the information has been successfully stored in the logging device,
 d) forwarding an expanded certificate request, which is supplemented with the confirmation identifier, to the certification point,
 e) checking the confirmation identifier, and
 f) processing the expanded certificate request only if the check has been successfully carried out, and
 g) outputting (S7) a certificate response using the certification point.

By supplementing the certificate request with the received confirmation identifier and forwarding the expanded certificate request, the certification point can check whether the request message was logged and can process the expanded certificate request and output a certificate only if this is the case, i.e., when the check is successful. It is therefore ensured that for each certificate requested from a registration point, a logging message is stored in the logging device and that a certificate is only output if the requesting registration point can prove logging of the request message on the basis of the confirmation identifier. The logging device is formed spatially separated from the sending registration point. Therefore, in the event of a manipulation of the registration point, the certificates requested by this registration point can be determined and, for example, declared invalid.

In one embodiment, the logging message comprises a user identifier which identifies the user of the certificate and a registration point identifier which identifies the sending registration point.

Via the registration point identifier, on the one hand, the requesting registration point can be identified and the user of the certificate can be determined. If a registration point is manipulated, all logging messages sent from the registration point can therefore be determined and thus the certificate requests and certificates which were requested by the manipulated registration point can be identified. The user can be informed at short notice about a potentially manipulated certificate on the basis of the user identifier. A certificate requested by the registration point can therefore be determined and, for example, blocked. The logging message can additionally comprise, for example, the entire content or a subset of the content of the certificate request.

In one embodiment, the confirmation identifier comprises an entry time of the logging message in the logging device.

Certificate requests can therefore be chronologically classified and, for example, certificate requests from before a point in time of the manipulation of the registration point can be distinguished from certificate requests which were created after this point in time and are therefore potentially manipulated.

In one embodiment, the confirmation identifier is signed using a cryptographic key of the logging device.

A change of the confirmation identifier after the issuance can therefore be detected and the logging device issuing the confirmation identifier can be identified by the certification point.

In one embodiment, the certificate request is transmitted via a chain of more than one registration point to the certification point and method steps a) to d) are executed in each of the registration points.

A certificate request can therefore be traced back to each individual registration point of a chain of successive registration points which processes and forwards the certification request. An inference is therefore solely restricted to the first registration point or the last registration point in a change of registration points.

In one embodiment, in a second and each following registration point of the chain of registration points, method steps e) and f) are executed before the execution of method steps a) to d).

An absent logging can therefore be detected in the preceding registration point and can therefore be detected early. An attack on the registration point receiving the certificate request by the preceding registration point can therefore be prevented.

In one embodiment, the expanded certificate request received in a following registration point is supplemented by the confirmation identifier received from the logging device in the following registration point.

The expanded certificate request therefore comprises a confirmation identifier for each registration point of the chain of registration points. The certification point can therefore identify each of the registration points. If one of these registration points is known to be manipulated, the check can be ended as unsuccessful.

In one embodiment, the information on the certificate request is stored in a block chain in the logging device.

In one embodiment, the information on the certificate request is stored in the logging device in a Merkle tree signed using a digital key of the logging device.

The logging message or the information on the certificate request is therefore stored in a revision-safe manner. A change of the stored information is identifiable.

According to a second aspect, an embodiment of the invention relates to a system for requesting certificates in a documented manner for a user comprising at least one registration point, a logging device, and a certification point, which are designed to execute the following steps:
  a) receiving a certificate request to issue a certificate for a user in the registration point,
  b) sending a logging message which contains information on the certificate request from the registration point to a logging device,
  c) receiving a confirmation identifier when the information has been successfully stored in the logging device,
  d) forwarding an expanded certificate request message, which is supplemented with the confirmation identifier, to the certification point, and
  e) checking the confirmation identifier, and
  f) processing the expanded certificate request and outputting a certificate response using the certification point only if the check has been carried out successfully.

In the system, the CA or each following registration point of a chain of registration points receives a confirmation that a logging message for the certificate request was transmitted to the logging device. In case of a security incident, it can therefore be documented who has placed the certificate request and when.

According to a third aspect, an embodiment of the invention relates to a registration device, comprising at least one processor which is designed to execute the following steps:
  a) receiving a certificate request to issue a certificate for user in the registration point,
  b) sending a logging message which contains information on the certificate request from the registration point to a logging device,
  c) receiving a confirmation identifier when the information has been successfully stored in the logging device,
  d) forwarding an expanded certificate request message, which was supplemented with the confirmation identifier, to the certification point.

The registration point not only logs a received certificate request, but rather confirms the logging using the confirmation identifier received from the logging device. Certificates requested by the registration point can therefore be identified more easily.

In one embodiment, the registration device is designed to receive an expanded certificate request and to carry out the following steps:
  checking the received confirmation identifier, and
  processing the expanded certificate request message according to steps b) to d) only when the check has been successfully carried out.

According to a fourth aspect, an embodiment of the invention relates to a logging device comprising at least one processor which is designed to carry out the following steps:
  receiving a logging message which contains information on the certificate request from a registration point,
  transmitting a confirmation identifier when the information has been successfully stored in the logging device to the registration point.

According to a fifth aspect, an embodiment of the invention relates to a certification point comprising at least one processor which is designed to carry out the following steps:
  receiving an expanded certificate request, which comprises a confirmation identifier, from a registration point,
  checking the confirmation identifier, and
  processing the expanded certificate request and issuing a certificate only if the check has been carried out successfully.

By checking the confirmation identifier, the certification point can identify absent logging of the certificate request by one of the registration points and therefore detect and repel a security risk due to the registration point early.

A sixth aspect of an embodiment of the invention relates to a computer program product (non-transitory computer readable storage medium having instructions, which when executed by a processor, perform actions), comprising a nonvolatile computer-readable medium which is loadable directly into a memory of a digital computer, comprising program code parts which, upon execution of the program code parts by the digital computer, prompt it to carry out the steps of the method.

Provided it is not indicated otherwise in the following description, the terms "receive", "send", "forward", "check", "process", and the like relate to actions and/or processes and/or processing steps which change and/or generate data and/or which convert data into other data, wherein the data are represented or can be present in particular as physical variables, for example as electrical pulses. The system and components optionally contained therein such as a registration point, a certification point, a logging device, a user, and the like can comprise one or more processors. A processor can in particular be a central processing unit (CPU), a microprocessor, or a microcontroller, for example an application-specific integrated circuit or a digital signal processor, possibly in combination with a storage unit for storing program commands, etc.

A computer program product, such as a computer program means, can be provided or supplied, for example, as a storage medium, such as a memory card, USB stick, CD-ROM, DVD, or also in the form of a downloadable file from a server in a network.

BRIEF DESCRIPTION

Some of the embodiments will be described in detail, with references to the following Figures, wherein like designations denote like members, wherein.

Parts corresponding to one another are provided with the same reference signs in all figures.

DETAILED DESCRIPTION

Digital certificates are increasingly being issued for devices which are used in an industrial environment, for example in an automation facility or in a distribution network, but also in a private environment, for example for devices in a household network or with access to the Internet. The digital certificate is used, for example, as a protection against plagiarism, using which a producer of the device can be checked and identified or for authenticating the device during a data communication. Digital certificates are also issued for services or applications on devices.

The digital certificate, referred to in short hereinafter as a certificate, is issued via a public-key infrastructure by one or more registration points and a certification point. It is important here that a request to issue a certificate is sent from trustworthy components, i.e., the device and the registration point, to the certification point. If an attacker gains possession of a credential, for example, using which the registration point identifies itself at the certification point, certificates can be requested by the attacker via the registration point at the certification point and installed, for example, on counterfeit devices and brought into circulation.

To be able to quickly identify such certificates obtained by fraud by the manipulated registration point and identify them in their entirety and subsequently be able to block them, for example, a reliable tracing back of each certificate request to the sending registration point is necessary.

Figure 1:
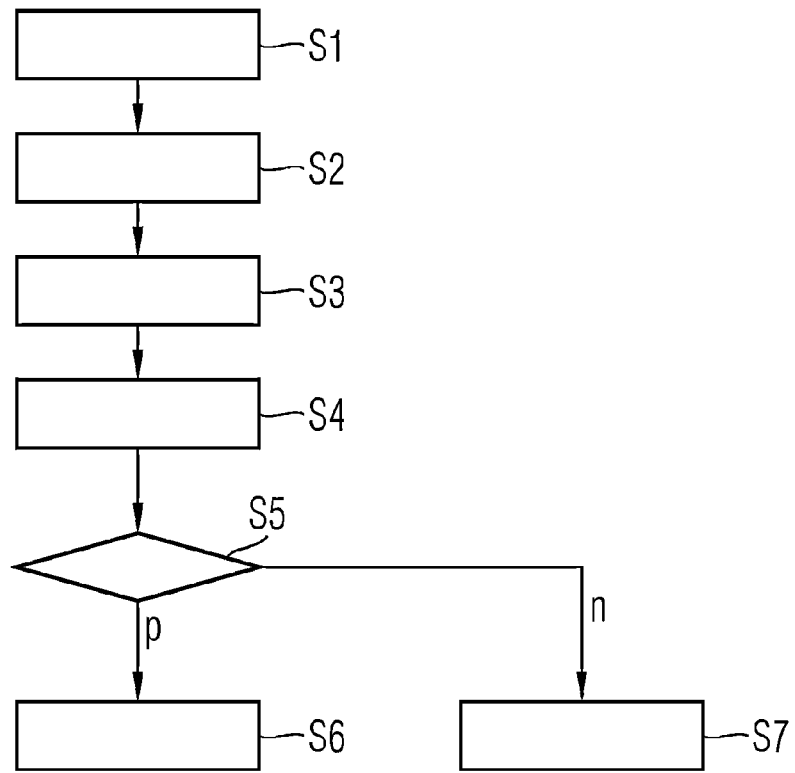
FIG. 1 shows an exemplary embodiment of the method as a flow chart.

Such a method will be explained on the basis of FIG. 1.

In a first method step S1, a certificate request to issue a certificate for a user is received in the registration point. A user is, for example, a device and a service on which the certificate is implemented. The registration point sends information on the received certificate request in a logging message to a logging device, see method step S2. The logging device stores this information in a revision-safe manner, so that a later change of the information is not possible or a change of the stored information is identifiable. The logging device logs all certificate requests which were generated by the connected registration points and sent to the certification point and stores this information in a revision-safe logbook.

The logging device sends back a confirmation identifier to the registration point when the information has been successfully stored. The confirmation identifier contains the one entry time of the logging message in the logging device and is digitally signed using a cryptographic key of the logging device.

The registration point receives the confirmation identifier, see method step S3, and forwards a certificate request expanded with the confirmation identifier to the certification point, see method step S4. The confirmation identifier is checked in the certification point, see step S5. The certificate request is only processed, see method step S6, if the check of the confirmation identifier, see method step S5, was carried out successfully. This is the case if a confirmation identifier is contained in the certificate request at all. In particular, the check is only successful when the signature of the confirmation identifier has been successfully checked and/or the contained entry time is confirmed as permitted.

The digital signature is, for example, only positively confirmed when the cryptographic key can be assigned to a trustworthy permitted logging device. The permitted logging device is designed as a central one set apart spatially from the registration point. If the confirmation identifier is not successfully checked in step S5, see arrow with marking n, the certificate request is not checked further and, for example, a corresponding response is sent to the registration point or the device, see method step S7.

Using the method, the certificate request is therefore only accepted and further processed by the closest certification point or also registration point if the sending registration point can prove that the certificate request was logged in a central logging device.

Figure 2:
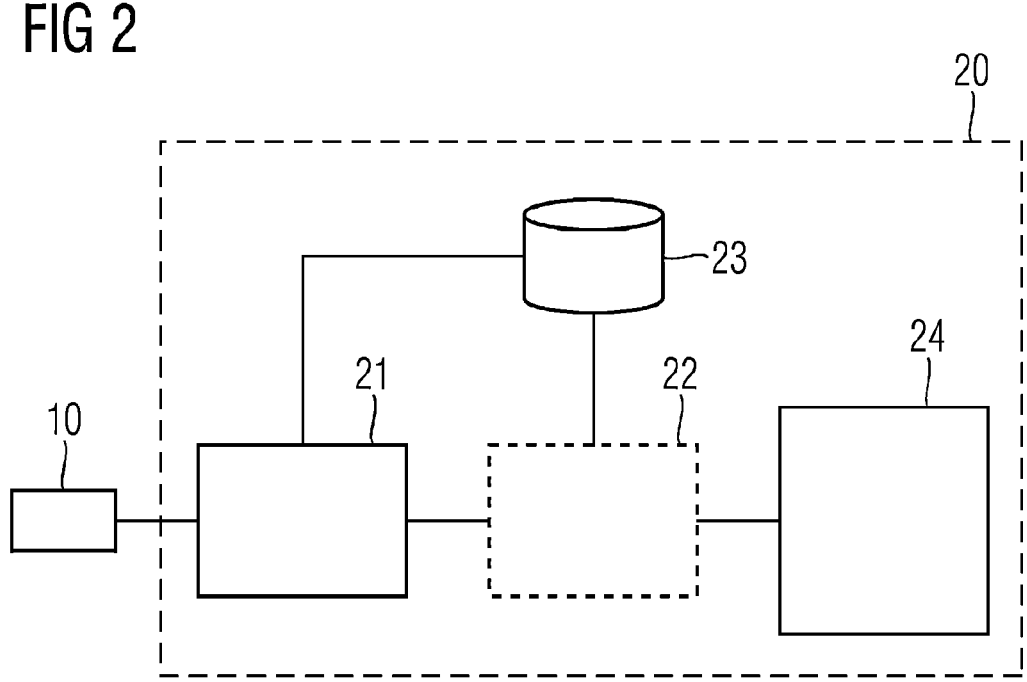
FIG. 2 shows a first exemplary embodiment of the system in a schematic view.

FIG. 2 shows a system 20 for the request in a documented manner of certificates by a user 10. The system comprises a registration point 21, as well as an optional further registration point 22, a logging device 23, and a certification point 24. The user 10 is connected to the system 20 and in particular to the registration point 21. The registration point 21 is connected either directly or via the further registration point 22 to the certification point 24. Multiple registration points connected to one another in series, here the registration point 21 and the further registration point 22, form a chain of registration points. Each of the registration points 21, 22 is connected to the logging device 23. The components of the system 20 are connected to one another and the user 10 is connected to the system 20 via data communication connections in each case.

The logging device 23 is arranged spatially separated from the registration points 21, 22. The logging device 23 logs all certificate requests which are generated by the connected registration points 21, 22 and sent to the certification point 24 and stores the information on the certificate requests in a revision-safe storage unit.

Figure 3:
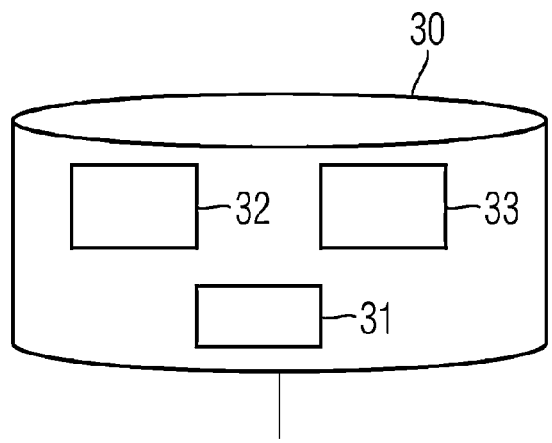
FIG. 3 shows an exemplary embodiment of a logging device in a schematic view.

FIG. 3 shows an exemplary embodiment 30 of the logging device 23 in detail. The logging device 30 comprises a data interface 31, a control unit 32, and a storage unit 33. The data interface 31 is designed to receive a logging message, which contains information on a certificate request, from the registration points 21, 22. The storage unit 33 is configured to store the logging message. In one embodiment variant, the storage unit 33 is configured to store the information in a block chain. In another embodiment variant, the storage unit 33 is configured to store the information on the certificate request in a hash tree signed using a digital key, also called a Merkle tree. The block chain comprises a continuously expandable list of data sets in individual blocks. New blocks are created according to a consensus method and appended by cryptographic methods to an existing chain. Each block typically contains a cryptographically secure hash of the preceding blocks, a timestamp, and transaction data. The hash tree is a tree of hash values of data blocks, for example from a file. The block chain and the hash tree were used to ensure the integrity of the information on the certificate request.

The control unit 32 is configured to generate a confirmation identifier which confirms the entry and the storage of the logging message. In one variant, the confirmation identifier comprises an entry time of the logging message in the logging device. The control unit creates a signature of the confirmation identifier depending on a cryptographic key of the logging device 30. The logging device 30 sends the signed confirmation identifier as a confirmation of the storage of the logging message via the data interface 31 back to the registration device 21.

Figure 4:
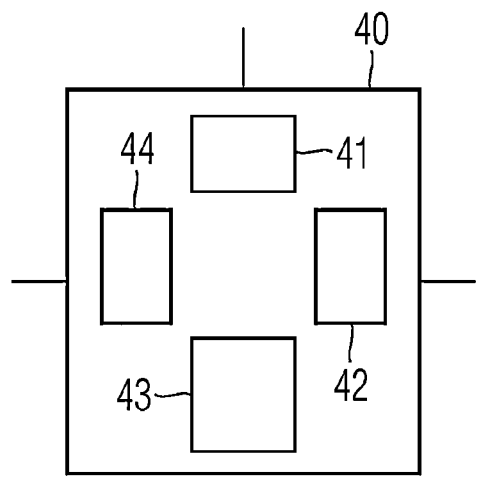
FIG. 4 shows an exemplary embodiment of a registration point in a schematic view.

FIG. 4 shows an exemplary embodiment 40 of the registration point 21 in detail. The registration point 40 comprises a user interface 41, which is designed to receive a certificate request to issue a certificate from the user 10. The registration device 40 furthermore comprises a logging interface 42, which is designed to send a logging message, which contains information on the certificate request, to a logging device 23, 30 and to receive a confirmation identifier from the logging device 23, 30. The registration device 40 furthermore comprises an output interface 43, which is designed to forward an expanded certificate request message, which was supplemented with the confirmation identifier, to the certification point 24. The registration device 40 furthermore comprises a logging unit 44, which is designed to generate a logging message, to create the information on the certificate request, which optionally additionally comprises a user identifier, which identifies the user of the certificate, and a registration point identifier, which identifies the sending registration point 40. The confirmation identifier received from the logging device 23 is added to the received certificate request and output as an expanded certificate request via an output interface 43 to the certification point 24, cryptographically signed using a key of the registration point 40.

Figure 5:
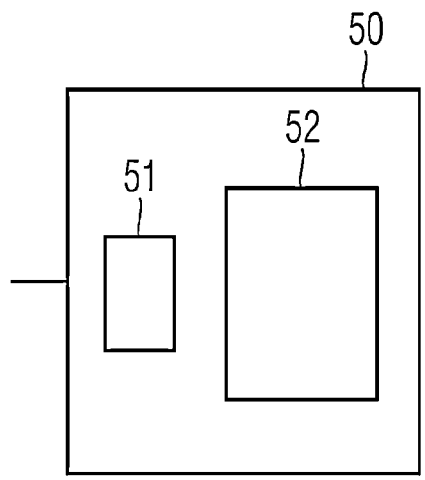
FIG. 5 shows an exemplary embodiment of a certification point in a schematic view.

FIG. 5 shows an exemplary embodiment 50 of the certification point 24 in detail. The certification point 50 comprises a certification interface 51 and an issuing unit 52. The certification interface 51 is designed to receive an expanded certificate request, which comprises a confirmation identifier, from a registration point 21, 40. The issuing unit 52 is designed to check the confirmation identifier and to process the expanded certificate request only if the check was carried out successfully. If this processing is successful, the certification point 50 outputs a certificate.

If the registration point 40 receives the certification request from a preceding registration point, the logging unit 44 is designed to check the confirmation identifier contained in the expanded certificate request and to process and forward the expanded certificate request only if the confirmation identifier was successfully checked. The registration point 40 logs the received certificate request and in turn receives a confirmation identifier from the logging device 23. The registration point 40 supplements the expanded certificate request received from the preceding registration point with the further confirmation identifier, which only confirms the logging by the logging device of a certificate response by the certification point if the check was carried out successfully.

Figure 6:
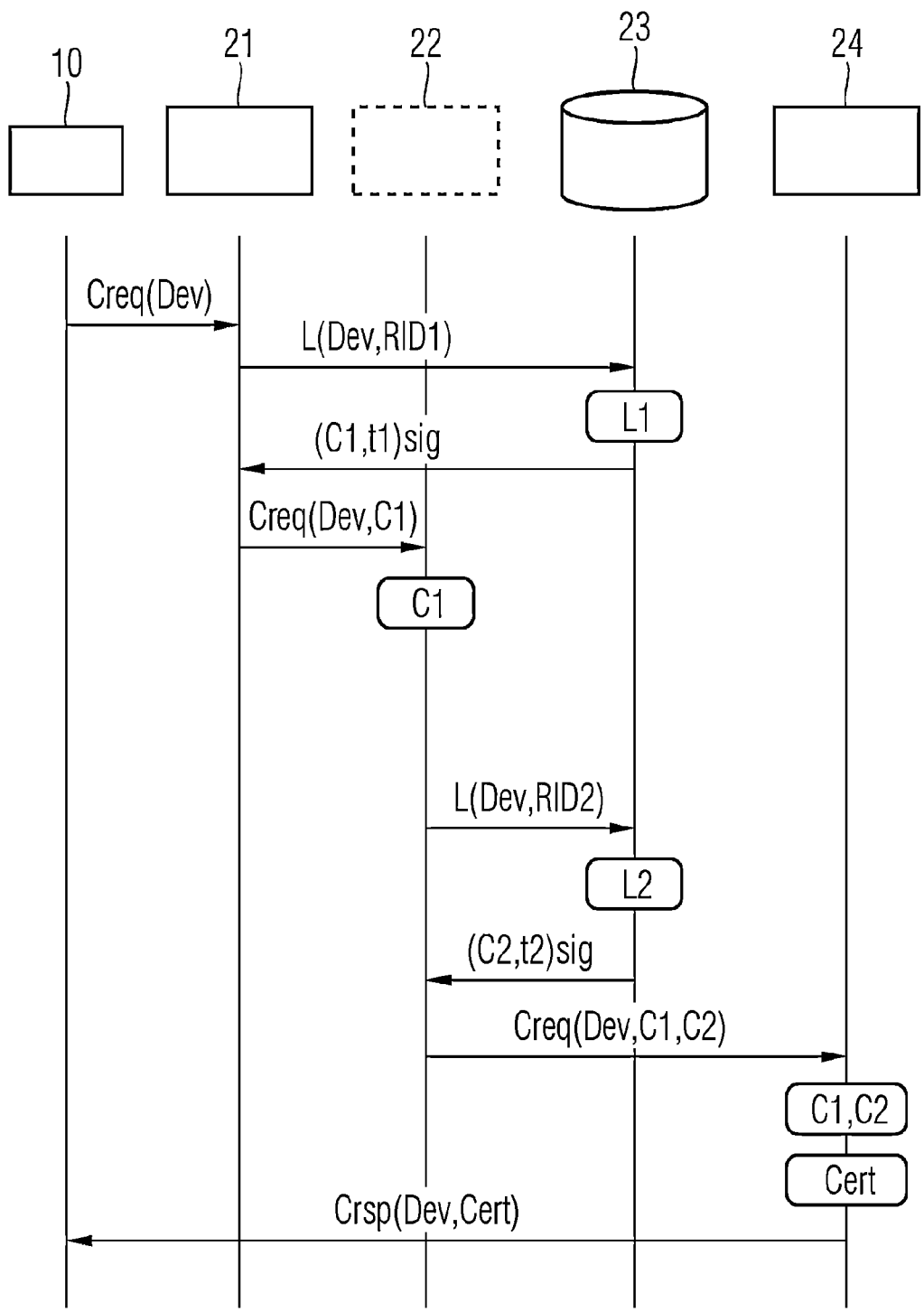
FIG. 6 shows a second exemplary embodiment of the method having a chain of registration points as a message flow chart.

FIG. 6 shows an exemplary embodiment of the method in which a certificate is requested by the user 10 at the certification point 24 in the system 20 shown in FIG. 2 having two successive registration points 21, 22.

The registration point 21 receives a certificate request Creq from the user 10. The registration point 21 sends a logging message L to the logging device 23. The logging message contains information on the certificate request. The information on the certificate request comprises at least one user identifier Dev of the user and a registration point identifier RID1, using which the registration point 21 can be uniquely identified. The information on the certificate request can comprise further parts or the entire certificate request. The logging device 24 stores the information on the certificate request, see L1, and sends a confirmation identifier C1, which optionally comprises an entry time t1, such as a timestamp, of the logging message and is signed by the logging device 24 back to the registration point 21. The registration point 21 forwards a certificate request Creq expanded by the signed confirmation identifier C1 and optionally the timestamp to the further registration point 22.

The further registration point 22 first tracks the confirmation identifier C1 from the expanded certificate request Creq. Only when this check has been carried out successfully, the further registration point 22 sends a logging message L with the user identifier Dev and the identifier RID2 of the further registration point 22 to the logging device 23. This stores the contained information, see L2, and sends a confirmation identifier C2 and a timestamp t2 back to the further registration point 23. This supplements the expanded certificate request Creq with the signed confirmation identifier C2 and forwards the request to the certification point 24.

The certification point 24 checks each of the confirmation identifiers and their signatures. If the check was successful, the certification point issues the requested certificate Cert and sends it back to the user 10.

The certification point or the further registration point therefore receives a confirmation that the certificate request was logged in the registration point. In case of an attack on the registration point 21, it can therefore be documented who has placed the certificate request and when. It is ensured by their revision-safe storage in the logging device that an attacker cannot change or erase the stored information.

Although the present invention has been disclosed in the form of embodiments and variations thereon, it will be understood that numerous additional modifications and variations could be made thereon, it will be understood that numerous additional modifications and variations could be made thereto without departing from the scope of the invention.

For the same of clarity, it is to be understood that the use of "a" or "an" throughout this application does not exclude a plurality, and "comprising" does not exclude other steps or elements.

The invention claimed is:

1. A method for requesting a certificate in a documented manner using at least one registration device and a certification device, comprising the following steps:
    a) receiving, by a registration device from a first device, a certificate request to issue the certificate;
    b) sending, from the registration device to a logging device, a logging message which contains information on the certificate request;
    c) receiving, by the registration device from the logging device, a confirmation identifier in response to the information having been successfully stored in the logging device;
    d) forwarding, by the registration device to the certification device, an expanded certificate request, which is supplemented with the confirmation identifier; and
    e) outputting, by the certification device, a certification response only in response to a correctness of the confirmation identifier having been successfully checked by the certification device and the expanded certificate request having been processed by the certification device,
    wherein the certification device is designed to: receive the expanded certification request, check the correctness of the confirmation identifier, and process the expanded certificate request.

2. The method as claimed in claim 1, wherein the logging message comprises a user identifier which identifies a user of the certificate and a registration device identifier which identifies the registration device.

3. The method as claimed in claim 1, wherein the confirmation identifier comprises an entry time of the logging message in the logging device.

4. The method as claimed in claim 1, wherein the confirmation identifier is signed using a cryptographic key of the logging device.

5. The method as claimed in claim 1, wherein the certificate request is transmitted via a chain of multiple registration devices to the certification device, and steps a) to c) are executed in each registration device of the multiple registration devices.

6. The method as claimed in claim 5, wherein the expanded certificate request received in a following registration device is supplemented with the confirmation identifier received from the logging device in the following registration device.

7. The method as claimed in claim 1, wherein the information on the certificate request is stored in a block chain in the logging device.

8. The method as claimed in claim 1, wherein the information on the certificate request is stored in the logging device in a hash tree signed using a digital key of the logging device.

9. A system for requesting certificates for a user in a documented manner comprising at least one registration device, a logging device, and a certification device, which are configured to execute the following steps:
    a) receiving, by a registration device from a first device, a certificate request to issue a certificate;
    b) sending, from the registration device to a logging device, a logging message which contains information on the certificate request;
    c) receiving, by the registration device from the logging device, a confirmation identifier in response to the information having been successfully stored in the logging device;
    d) forwarding, by the registration device to the certification device, an expanded certificate request, which is supplemented with the confirmation identifier; and
    e) outputting, by the certification device, a certification response only in response to a correctness of the confirmation identifier having been successfully checked by the certification device and the expanded certificate request having been processed by the certification device,
    wherein the certification device is designed to: receive the expanded certification request, check the correctness of the confirmation identifier, and process the expanded certificate request.

10. A registration device, comprising at least one processor, which is configured to execute the following steps:
    a) receiving, by the at least one processor from a first device, a certificate request to issue a certificate;
    b) sending, from the at least one processor to a logging device, a logging message which contains information on the certificate request;
    c) receiving, by the at least one processor from the logging device, a confirmation identifier in response to the information having been successfully stored in the logging device and;
    d) forwarding, by the at least one processor to a certification device that is coupled to the registration device, an expanded certificate request message, which was supplemented with the confirmation identifier, wherein the certification device is enabled to output a certification response only in response to a correctness of the confirmation identifier having been successfully checked by the certification device and the expanded certificate request having been processed by the certification device,
    wherein the certification device is designed to: receive the expanded certification request, check the correctness of the confirmation identifier, and process the expanded certificate request.

11. A computer program product, comprising a computer readable hardware storage device having computer readable program code stored therein said program code executable by a processor of a computer system to implement the method, as claimed in claim 1.

* * * * *